Jan. 29, 1935.　　F. F. HUTCHINSON　　1,989,233
CURRENT CONVERTING SYSTEM AND APPARATUS
Filed Feb. 15, 1932
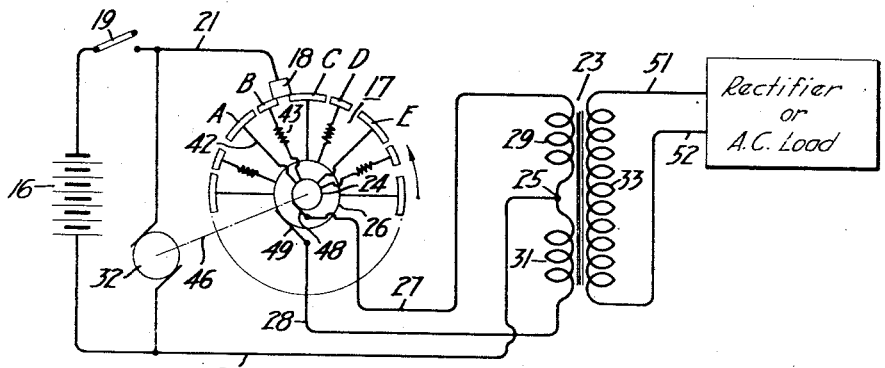
FIG_1_
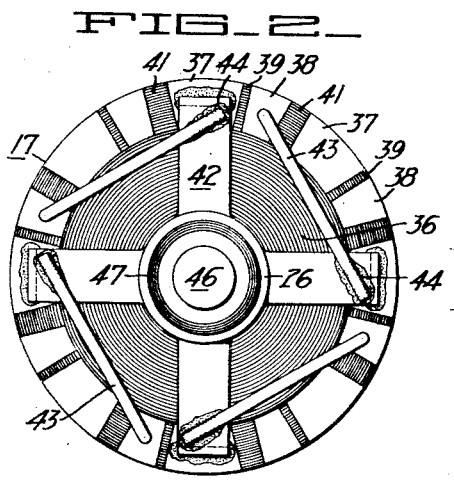
FIG_2_
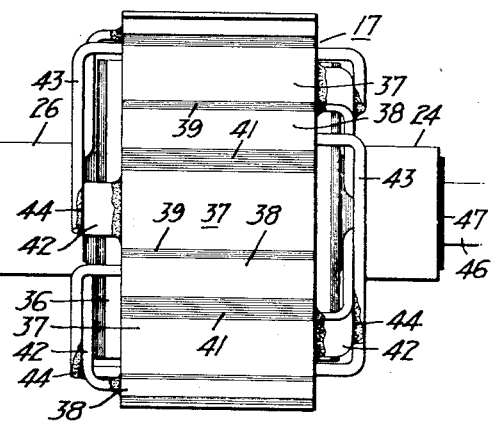
FIG_3_
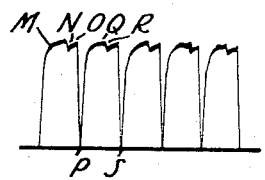
FIG_4_
Current thru commutator.
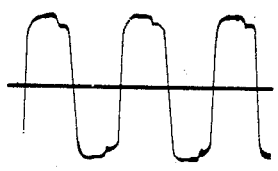
FIG_5_
Full load-Primary voltage.
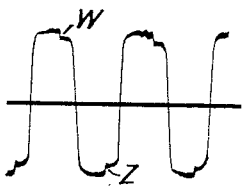
FIG_6_
Full load-Secondary voltage.
INVENTOR.
Fenton F. Hutchinson
BY
White, Prost, Fisher & Lothrop
ATTORNEYS.

Patented Jan. 29, 1935

1,989,233

UNITED STATES PATENT OFFICE 1,989,233

CURRENT CONVERTING SYSTEM AND APPARATUS

Fenton F. Hutchinson, San Francisco, Calif., assignor to Hutch-Gard Corporation, Ltd., San Francisco, Calif., a corporation of California Application February 15, 1932, Serial No. 592,935

12 Claims. (Cl. 175—364)

This invention relates to current converting systems and apparatus. More particularly, it relates to systems for converting current from a direct current source into an alternating current having definite frequency and voltage characteristics.

In my co-pending application, Serial No. 519,884, filed March 3, 1931, and entitled "Current converting systems", I have disclosed systems of this general type in which a rotatable commutator or a vibratory interrupter can be used for interrupting the current from a direct current source and means is disclosed for inverting alternate impulses of the interrupted current to obtain an alternating current of the desired frequency. By means of a transformer the voltage of the alternating current can be changed to any desired value and rectifying apparatus can be employed, if desired, for reconverting the alternating current into a direct current, having a voltage different from that of the original direct current.

The present invention is directed to systems of the general type disclosed in my application above referred to and novel means is provided for rendering the wave form of the alternating current obtained particularly suitable for efficient rectification by means of rectifying apparatus now in commercial use.

Accordingly, it is one object of the invention to provide a system for converting direct current into an alternating current having a wave shape which is particularly suitable for rectification or reconversion into direct current of different voltage.

Another object is to provide a system for converting direct current obtainable from a storage battery into an alternating current which is particularly suitable for operating radio apparatus and the like designed for operation on 110 volt-60 cycle alternating current.

Another object is to provide a novel commutator for interrupting the continuous flow of current from a direct current source at a definite frequency, without completely breaking the circuit in which means is provided for imparting a wave form to the impulses such that when the current is impressed across the input terminals of a transformer, the full load output voltage of the transformer approaches a square topped wave form.

Another object is to provide a commutator of the character described, having a plurality of conducting segments in which certain segments have a greater effective width than the remaining segments.

Still another object is to provide a commutator of the character described in which certain ones of the conducting segments have electrical characteristics which differ from the electrical characteristics of the other conducting segments in the commutator.

These and other objects and advantages are attained in the embodiment of the invention illustrated, in which:

Fig. 1 is a circuit diagram illustrating one manner in which the electrical connections can be made in a system incorporating the principles of the invention.

Fig. 2 is a side elevational view of a commutator embodying the principles of the invention.

Fig. 3 is an elevational view of the commutator taken perpendicular to the view illustrated in Fig. 2.

Figs. 4, 5 and 6 are reproductions of oscillograms used in explaining the operation of the system.

In its preferred form, the system comprises a source of direct current and a rotatable commutator is provided for periodically interrupting the continuous flow of the current from said source without completely breaking the circuit. Suitable means, such as a transformer having a split primary winding, is provided for inverting alternate current impulses and for stepping up the current to the desired value. The embodiment of the invention illustrated is particularly suitable for converting direct current obtainable from a storage battery into 110 volt-60 cycle alternating current for operating radio receiving and transmitting apparatus or other apparatus utilizing electron relays or radio tubes. Unidirectional current is desirable and sometimes required for energizing the various parts of a radio circuit, such as the plate circuits of the electron relays, for example. It is advantageous, therefore, to provide alternating current which has a wave shape which is suitable for rectification. Generally, alternating current having a wave form which approaches a square topped wave can be rectified more efficiently and more satisfactorily than alternating current which has a greater departure from the square topped wave form. For this reason, the commutator of my invention is preferably provided with a means for imparting a wave shape to the alternating current which approaches a square top. In the embodiment illustrated, the commutator is provided with segments arranged in pairs, one segment of each pair being larger than the other segment of the pair and the smaller segment of each pair having greater impedance to current flow than the larger segment. It has been found that this construction greatly improves the wave shape of the alternating current in that the wave form more nearly approaches a square top and the interval of zero voltage between half cycles is reduced to a minimum.

Referring now to the drawing, and first to the circuit diagram illustrated in Fig. 1, I have shown a source of direct current 16, which may be a storage battery or a direct current generator. For interrupting the continuous flow of the current from the source 16 at a definite frequency, and without completely breaking the direct current circuit, a rotatable commutator 17 is provided and a brush 18, making wiping contact with the segments of the commutator, is connected through a switch 19 and the conductor 21 to one side of the source 16. The other side of the source 16 is connected by a conductor 22 to a center tap 25 on the primary winding of a transformer 23. A pair of slip rings 24 and 26 serve to direct alternate impulses over the conductors 27 and 28, the conductor 27 being connected to the coil 29 of the primary winding of the transformer and the conductor 28 being connected to the coil 31 of the primary winding. For rotating the commutator 17 a motor 32 can be provided which can be made to rotate at the desired speed when energized by the source 16.

The current impulses from the source 16 pass alternately through the coils 29 and 31 of the primary winding of the transformer 23, thereby inducing an alternating current in the secondary winding 33 of the transformer. The ratio between the primary and secondary windings of the transformer can have any desired value so that current of any desired voltage can be produced in the output of the transformer. The frequency of the output current will be determined by the rate at which the commutator 17 is rotated.

One of the uses contemplated for the system is to derive current from a storage battery, such as the storage battery found in every automobile, which is suitable for operating alternating current radio receiving sets designed for 110 volt-60 cycle alternating current. When a 6-volt storage battery is employed, a motor 32 can be used which, when energized by current from the storage battery, serves to rotate the commutator 17 at a rate which effects reversal of the current 120 times a second, thereby inducing 60 cycle alternating current in the secondary winding 33 of the transformer. The ratio between the number of turns in the primary and secondary windings of the transformer can have a value such that 6-volt alternating current is stepped up to 110-volt alternating current, when the transformer is connected in the manner shown in Fig. 1.

For highest efficiency, it is desirable to reduce the interval between successive current impulses to the smallest possible value, so that upon subsequent rectification of the produced alternating current, the rectified current will not have pronounced zero voltage intervals between the periods of maximum voltage. It is also desirable to impart a wave form to the voltage of the produced alternating current which approaches as closely as possible a square topped wave, so that upon reversal of alternate half-cycles a more uniform voltage will result.

For accomplishing these objects, the commutator 17 can have the construction shown in detail in Figs. 2 and 3. The commutator comprises a body portion 36 of insulating material and carries a plurality of relatively large conducting segments 37 and a plurality of smaller conducting segments 38 about its periphery. The conducting segments are arranged in pairs, one of the larger conducting segments 37 and one of the smaller segments 38 constituting a pair. An insulating segment 39 of relatively small effective width is interposed between the conducting segments of each pair and an insulating segment 41 of greater effective width is interposed between successive pairs of conducting segments. Both of the conducting segments in each pair are electrically connected to one of the slip rings 24 or 26 and the segments in the succeeding pair of segments are both connected to the other slip ring. Thus, alternate pairs of conducting segments are all connected to one of the slip rings and the remaining pairs of conducting segments are all connected to the other slip ring. The electrical connection between the larger segment 37 of each pair and its associated slip ring 24 or 26 has negligible electrical resistance and for making this connection a relatively heavy conductor 42 of material having good conductivity, such as copper, can be employed. The smaller segment 38 of each pair is connected to the associated slip ring by means of a conductor having sufficient resistance to alter the current flowing from the segment to the slip ring. Thus, I have shown a conductor 43 of relatively small cross section interconnecting each of the smaller segments 38 with one of the slip rings. The conductor 43 can be made of material having relatively high resistance, such as German silver, so that the conductor can be made relatively rugged. To enable the use of a conductor of greater length and therefore of higher resistance, the conductor 43 can extend to one of the conductors 42 if desired, and can be soldered thereto, as at 44, instead of extending directly to the slip ring across the shortest path. The conductor 43 can have a construction, however, which will afford the desired resistance when it extends directly to the slip ring or, if desired, the conductor 43 can be bent or coiled to provide the desired length. The resistance of conductor 43 should preferably be such that the current flowing therein is reduced to a value which will approximately neutralize the current flowing through the next succeeding segment at the instant the brush 18 leaves one of the small segments 38, as will be more fully explained hereinafter. In each case, therefore, the correct resistance will depend upon the electrical characteristics of the other parts of the circuits involved.

For convenience in manufacture, one of the slip rings, such as the slip ring 24, can be disposed on one side of the commutator and the other slip ring 26 can be disposed on the other side of the commutator. Both of the rings 24 and 26 are preferably insulated from the commutator shaft 46 by suitable insulating material 47.

In the operation of the system, the switch 19 is closed, thereby completing the circuit to the motor 32 which thereupon rotates the commutator 17, preferably in the direction indicated by the arrow in Fig. 1. The only load on the motor 32 arises from its own friction and from the friction of the commutator. This motor, therefore, can be of relatively small size. If desired, a separate switch can be interposed in the circuit between the commutator 17 and the source of current 16, as disclosed in my co-pending application above referred to, so that the motor is allowed to attain its full speed before the commutator is connected into the circuit. However, the motor 32 attains its normal speed rather rapidly on account of the small load thereon and a single switch 19 can be employed as shown in Fig. 1 for connecting both the motor and the commutator 17 into the circuit at the same time.

Assuming that the motor is rotating the commutator at normal speed and that the brush 18 is making instantaneous engagement with the segment A in Fig. 1, current will flow from the source 16 through switch 19, conductor 21, brush 18, segment A, conductor 42, ring 24, brush 48, conductor 27, coil 29 of the transformer 23, and over the conductor 22 back to the other side of the source 16. The value of the current through the commutator circuit at this time is represented by the portion M of the oscillogram of Fig. 4. As the commutator rotates further in the direction of the arrow, the brush 18 leaves segment A and makes contact with segment B. The insulating segment between conducting segments A and B is considerably narrower than the contacting surface of the brush 18 so that the circuit is not opened, but remains the same as before except that the resistance 43 is inserted in the circuit. At the instant the brush 18 leaves the segment A a slight drop in the current flowing is registered by the oscillograph as shown by the dip N in the oscillogram. Immediately thereafter the current increases slightly, as indicated at O, while the brush 18 is still on the segment B. This slight increase in current is probably due to the back EMF in the transformer windings set up by the sudden drop in the current flow. Just as the current is about to resume a constant value, the next conducting segment C of the commutator is engaged by the brush 18. Brush 18 is preferably sufficiently wide to bridge the insulating segment 41 between segments B and C and to make contact with the segment C before it has completely left the segment B. Current flowing through segment C, therefore, is building up while the current flowing through segment B is decreasing and when the current through segment C has reached an appreciable value, the brush 18 leaves segment B. It will be noticed at this point that the current flowing through segment C passes through the other coil 31 of the transformer primary winding over a circuit which can be traced from the source 16, switch 19, brush 18, segment C, slip ring 26, brush 49, conductor 28, coil 31 and conductor 22, back to the other side of the source 16. At the instant that the brush 18 leaves segment B, the current falls to zero, with the exception of current consumed by transformer losses, as indicated at P on the oscillogram, for an instantaneous interval, although the circuit through the commutator and the conductor 22 has not been opened. This condition is believed to be attributable to the neutralization of the back EMF set up in the transformer windings by the current flowing in coil 29 by that being built up by the current flowing in the opposite direction through the coil 31. The effective neutralization of the back EMF in this manner at the instant the brush leaves segment B permits the building up of the current flow through the segment C to continue and in an extremely short interval the current again reaches its full value, as indicated at Q on the oscillogram. A slight drop R in the current is recorded, corresponding to the drop N, when the brush 18 leaves segment C and engages the other segment D of this pair. When the brush leaves the segment D and engages the segment E, another instantaneous interval of zero current S, with the exception of transformer current above-mentioned, is recorded and the cycle is then repeated.

Since the brush 18 is always in contact with at least one conducting segment, sparking is entirely eliminated. The amount by which the brush overlaps the last segment of one pair and the first segment of the succeeding pair should preferably not be so small that the current does not have time to build up to a sufficient value before the brush leaves the passing segment, nor should it be so large that the currents in the windings 29 and 31, respectively, mutually neutralize each other for any appreciable period. If the overlap is made too small, there will be sparking at the brush 18 and if the overlap is made either too large or too small, the interval of zero voltage between half cycles will be increased and inefficient operation will result. By reducing the current flow to the extent indicated near the end of each current impulse, the succeeding current impulse can be made to neutralize the effect thereof more readily while the second impulse is building up and before it has reached its full value.

Fig. 5 is a reproduction of an actual oscillogram taken of the input voltage across the conductors 27 and 28. Fig. 6 is a reproduction of an actual oscillogram of the output voltage across the conductors 51 and 52. Both recordings were made with full load connected across the output of the transformer. It will be noticed that the secondary voltage wave approaches much more closely a square topped wave than a sine wave of corresponding frequency and amplitude does, on account of the suddenness with which the voltage attains its maximum value in both the positive and negative directions. Aside from the slight dip indicated at W and Z, caused by the resistance of the second segment of each pair of segments in the commutator, the voltage remains fairly constant at its maximum value. The wave shape in general is such that it readily lends itself to efficient rectification and actual tests have demonstrated that 110 volt-60 cycle current obtained in the manner described, from a 6-volt storage battery, operates an alternating current radio receiving set with less wattage consumption than the commercial 110 volt-60 cycle current having an approximate sine wave form.

The system which I have described is particularly applicable to the operation from a storage battery of radio apparatus and the like, which is designed for 110 volt-60 cycle current. When the storage battery of an automobile is employed, the system derives its power from the charger or generator when the engine is running and the battery then floats on the line and merely serves to iron out any fluctuations in the charging current. Accordingly, when the charging current exceeds the demand of the system, as it does in operating commercially produced radio receiving sets of average size, there is no drain on the battery whatever. While the operation of alternating current radio receiving sets from a storage battery is believed to be one of the most desirable uses of the system, the utility of the invention is by no means limited to this extent, since any other apparatus designed for operation on alternating current can be successfully operated, provided of course, its watt rating is not greater than that which can be derived from the direct current source being used.

While I have shown and described a preferred embodiment of my invention, it is to be understood that I do not wish to be limited thereto, since the invention as defined in the appended claims can be embodied in a plurality of other forms.

I claim:

1. In a system adapted to convert current from a direct current source to an alternating current, a rotatable commutator comprising a series of conducting segments arranged in pairs of successive segments, a slip ring to which alternate pairs of segments are electrically connected and a second slip ring to which the remaining pairs of segments are electrically connected.

2. In a system adapted to convert current from a direct current source to an alternating current, a rotatable commutator comprising a series of conducting segments arranged in pairs, an insulating segment between the conducting segments of each pair, and an insulating segment of greater width between successive pairs of conducting segments.

3. In a system adapted to convert current from a direct current source to an alternating current, a rotatable commutator comprising a series of conducting segments arranged in pairs, an insulating segment between the conducting segments of each pair, an insulating segment of greater width between successive pairs of conducting segments, and a brush making successive contact with all of said segments, the effective width of said brush being sufficiently great to bridge any one of said insulating segments.

4. In a system adapted to convert current from a direct current source to an alternating current, a rotatable commutator comprising a series of conducting segments arranged in pairs, a slip ring to which alternate pairs of segments are electrically connected, and a second slip ring to which the remaining pairs of segments are electrically connected, the electrical connection between one of the segments of each pair and its associated ring having greater resistance than the electrical connection between the other segment of the pair and the associated ring.

5. In a system adapted to convert current from a direct current source to an alternating current, a rotatable commutator comprising a series of conducting segments arranged in pairs, one of the segments of each pair having a greater effective width than the other segment of the pair, a slip ring to which alternate pairs of segments are electrically connected, a second slip ring to which the remaining pairs of segments are electrically connected, the electrical connection between the smaller segment in each pair and its associated ring having greater resistance than the electrical connection between the larger segment of the pair and the associated ring.

6. In a system adapted to convert current from a direct current source to an alternating current, a rotatable commutator comprising a series of conducting segments arranged in pairs, one of the segments of each pair being of greater effective width than the other segment of the pair, an insulating segment between the conducting segments of each pair, and an insulating segment of greater width between successive pairs of conducting segments.

7. In a system adapted to convert current from a direct current source to an alternating current, a rotatable commutator comprising a series of conducting segments arranged in pairs, one of the segments of each pair being greater than the other segments of the pair, an insulating segment between the conducting segments of each pair, an insulating segment of greater width between successive pairs of conducting segments, and a brush making successive contact with all of said segments, the effective width of said brush being sufficiently great to bridge any one of said insulating segments.

8. In a system adapted to convert current from a direct current source to an alternating current, a rotatable commutator comprising a series of conducting segments arranged in pairs, one of the segments of each pair being greater than the other segment of the pair, a slip ring to which alternate pairs of segments are electrically connected, and a second slip ring to which the remaining pairs of segments are electrically connected, an insulating segment between the conducting segments of each pair, and an insulating segment of greater width between successive pairs of conducting segments, the electrical connection between the smaller segment in each pair and its associated ring having greater resistance than the electrical connection between the larger segment of the pair and the associated ring, and a brush making successive contact with all of said segments, the effective width of said brush being sufficiently great to bridge any one of said insulating segments.

9. In a current converting system of the character described, a transformer having input and output windings, the input winding having an electrical tap at its midpoint to divide the same into halves a source of direct current, a commutator for converting the current from said source to an alternating current and to render the same suitable for transmission through said transformer, said commutator comprising a plurality of conducting segments, a brush connected to one side of said source of current and making successive contact with said segments, a slip ring, the segments on said commutator being arranged in pairs and alternate pairs being connected to said slip ring, the electrical connection between one of the segments in each pair having greater resistance than the electrical connection between the other segment of the pair and the ring, and a second slip ring to which the remaining pairs of segments are similarly connected, whereby the full load voltage across the output terminals of said transformer is made to approach a square topped wave form when the terminals of the halves of the input winding are connected to said segments through said slip rings and the midpoint of the input winding is connected to the other side of said source of current.

10. In a current converting system of the character described, a transformer having input and output windings, the input winding having an electrical tap at its midpoint to divide the same into halves, a source of direct current, a commutator for converting the current from said source to an alternating current and to render the same suitable for transmission through said transformer, said commutator comprising a plurality of conducting segments, a brush connected to one side of said source of current and making successive contact with said segments, a slip ring, the segments on said commutator being arranged in pairs and alternate pairs being connected to said slip ring, one of the segments of each pair having a greater effective width than the other segment of the pair, the electrical connection between the smaller segment of each pair and said slip ring having greater electrical resistance than the electrical connection between the larger segment of the pair and the slip ring, an insulating segment between the conducting segments of each pair and an insulating segment of greater width between successive pairs of conducting segments, the effective width of said brush being sufficiently great to bridge any one of the insulating segments, and a second slip ring to which the remaining pairs of segments are similarly connected, whereby the full load voltage across the output terminals of said transformer is made to approach a square topped wave form when the terminals of the halves of the input winding are connected to said segments through said slip rings and the midpoint of the input winding is connected to the other side of said source of current.

11. The method of converting the current from a direct current source to an alternating current having substantially a square topped wave form; said method comprising reducing the interval of the lapsed time between successive current impulses induced in a closed electrical circuit which includes the direct current source, the reduction in time intervals between successive impulses being effected by recurrently and alternately reducing and building up the current flow in one direction in said closed circuit while simultaneously and alternately building up and reducing the current flow in the opposite direction in said closed circuit.

12. In a system adapted to convert current from a direct current source to an alternating current, an electrical circuit including a direct current source, a transformer, a conductor connecting one side of said direct current source to a center tap on the primary of said transformer, the primary thereby being divided into halves, a rotatable commutator; said commutator including a plurality of pairs of conducting segments each consisting of a relatively large segment and a relatively small segment, insulating segments between each pair of said conducting segments, an insulating segment narrower than said first-named insulating segment between the conducting segments of each pair, a brush for making wiping contact with all of said segments and connected to the other side of said direct current source, the wiping surface of said brush being greater than the width of any one of said insulating segments so that the brush is always in contact with at least one of said conducting segments and the circuit is always closed, a pair of slip rings, a conductor connecting one of said slip rings to one half of the primary of said transformer, a conductor connecting the other of said rings to the other half of said primary, a pair of conductors connecting alternate pairs of segments to one of said rings, a pair of conductors connecting the remaining pairs of said segments to the other of said rings, the larger segments of each pair being connected to its associated ring by a conductor of negligible electrical resistance, and the smaller segments of each pair being connected to its associated ring by a conductor of appreciable resistance, and means for driving said commutator.

FENTON F. HUTCHINSON.